United States Patent
Choi et al.

(10) Patent No.: US 10,593,477 B2
(45) Date of Patent: Mar. 17, 2020

(54) CAPACITOR COMPONENT

(71) Applicant: SAMSUNG ELECTRO-MECHANICS CO., LTD., Suwon-si, Gyeonggi-do (KR)

(72) Inventors: Woo Jin Choi, Suwon-si (KR); Young Ghyu Ahn, Suwon-si (KR); Jong Duck Kim, Suwon-si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/973,211

(22) Filed: May 7, 2018

(65) Prior Publication Data

US 2019/0189348 A1 Jun. 20, 2019

(30) Foreign Application Priority Data

Dec. 19, 2017 (KR) .................. 10-2017-0175276

(51) Int. Cl.
*H01G 4/30* (2006.01)
*H01G 4/232* (2006.01)
*H01G 4/224* (2006.01)

(52) U.S. Cl.
CPC .......... *H01G 4/2325* (2013.01); *H01G 4/224* (2013.01); *H01G 4/232* (2013.01); *H01G 4/30* (2013.01)

(58) Field of Classification Search
CPC ........ H01G 4/005; H01G 4/008; H01G 4/012; H01G 4/12; H01G 4/30; H01G 4/232; H01G 4/228; H01G 4/248; H01G 4/1227; H01G 4/2325
See application file for complete search history.

(56) References Cited

U.S. PATENT DOCUMENTS

| | | | |
|---|---|---|---|
| 10,204,739 B1* | 2/2019 | Ji | H01G 4/248 |
| 2009/0002900 A1* | 1/2009 | Chiu | G03B 21/16 |
| | | | 361/1 |
| 2012/0134066 A1* | 5/2012 | Kim | H01G 4/2325 |
| | | | 361/305 |
| 2014/0135788 A1* | 5/2014 | Collins | A61B 17/00234 |
| | | | 606/114 |
| 2015/0047887 A1* | 2/2015 | Lee | H05K 1/111 |
| | | | 174/260 |

(Continued)

FOREIGN PATENT DOCUMENTS

| | | |
|---|---|---|
| JP | 2003-100548 A | 4/2003 |
| KR | 10-2016-0016392 A | 2/2016 |
| KR | 10-2017-0118584 A | 10/2017 |

*Primary Examiner* — Nguyen T Ha
(74) *Attorney, Agent, or Firm* — Morgan, Lewis & Bockius LLP

(57) ABSTRACT

A capacitor component includes: a body having a first main surface and a second main surface facing each other in a thickness direction and side surfaces facing each other in a length direction and connected to the first and second main surfaces, the body including a plurality of dielectric layers and a plurality of internal electrodes stacked in the thickness direction and alternately exposed through the side surfaces of the body with each of the plurality of dielectric layers interposed therebetween; and external electrodes disposed on the side surfaces and the second main surface of the body and electrically connected to the plurality of internal electrodes.

23 Claims, 3 Drawing Sheets

(56) References Cited

U.S. PATENT DOCUMENTS

| | | | |
|---|---|---|---|
| 2015/0124370 A1* | 5/2015 | Ahn | H01G 4/224 |
| | | | 361/272 |
| 2016/0020031 A1* | 1/2016 | Shin | H01G 4/38 |
| | | | 174/260 |
| 2016/0042865 A1 | 2/2016 | Hong et al. | |
| 2016/0205769 A1* | 7/2016 | Park | H01G 4/224 |
| | | | 174/260 |
| 2017/0301468 A1 | 10/2017 | Kim et al. | |

* cited by examiner

CAPACITOR COMPONENT

CROSS-REFERENCE TO RELATED APPLICATION(S)

This application is based on and claims the benefit of priority to Korean Patent Application No. 10-2017-0175276 filed on Dec. 19, 2017 in the Korean Intellectual Property Office, the entire disclosure of which is incorporated herein by reference.

TECHNICAL FIELD

The present disclosure relates to a capacitor component.

BACKGROUND

A multilayer ceramic capacitor (MLCC), which is one of the capacitor components, is a chip type capacitor which is mounted on a printed circuit board of various electronic products of image devices such as a liquid crystal display (LCD) and a plasma display panel (PDP), a computer, a smartphone, a mobile phone, and the like to serve to charge or discharge electricity.

The multilayer ceramic capacitor may be used as a component of various electronic devices due to advantages of miniaturization, high capacity, and ease of mounting. In recent years, multilayer ceramic capacitors, used for mobile devices, automobile components or the like, need to have a high level of mechanical strength and should be able to withstand environments in which they may be subjected to repeated external shocks, vibrations, severe temperatures and humidity. In particular, when a capacitor is mounted on a substrate and used, stress may be applied to the capacitor due to bending of the substrate or the like. Cracks may occur in the capacitor due to the stress, which may cause problems such as a short failure of an internal electrode.

SUMMARY

An aspect of the present disclosure may provide a capacitor component which has improved mechanical strength to be able to reduce the occurrence of cracks even when the capacitor is mounted on a substrate.

According to an aspect of the present disclosure, a capacitor component may include: a body having a first main surface and a second main surface facing each other in a thickness direction and side surfaces facing each other in a length direction and connected to the first and second main surfaces, the body including a plurality of dielectric layers and a plurality of internal electrodes stacked in the thickness direction and alternately exposed through the side surfaces of the body with each of the plurality of dielectric layers interposed therebetween; and external electrodes disposed on side surfaces and the second main surface of the body and electrically connected to the plurality of internal electrodes, wherein portions of the external electrodes adjacent to the second main surface of the body has a step shape including a contact portion, which is a portion in contact with the second main surface, and a mounting portion, which is a portion to be mounted on another component outside the capacitor component, the contact portion having a greater length than the mounting portion.

The external electrodes may have a first layer including the contact portion, a second layer covering a portion of the first layer, and a third layer covering a portion of the second layer.

The first layer may cover a portion of the second main surface of the body.

The second layer may be in contact with the side surfaces of the body.

The second layer may cover a portion of the first layer, and a region of the first layer not covered by the second layer may be in contact with the third layer.

The second layer may further extend to cover a portion of the first main surface of the body.

A portion which is a region of the third layer covering the second layer and disposed on the second main surface may form the mounting portion.

The first layer may cover the side surfaces and the second main surface of the body, and a region of the first layer covering the second main surface may form the contact portion.

The second layer may cover at least the second main surface side of the body.

The third layer may cover at least the second main surface side of the body.

The second layer may cover a portion of the first layer, and a region of the first layer not covered by the second layer may be in contact with the third layer.

The capacitor component may further include: a protective layer covering portions of the first layer that corresponds to the side surfaces of the body.

The first layer may be a sintered electrode, the second layer may be a resin electrode, and the third layer may be a plating layer.

The capacitor component may further include: an insulating layer formed on the second main surface of the body to cover at least a part of the contact portion.

The insulating layer may overlap with the contact portion of the external electrodes in the length direction by a predetermined length.

The portions of the external electrodes may further extend to cover a portion of the first main surface, and the portions of the external electrodes corresponding to the first and second main surfaces may have an asymmetrical structure with respect to each other.

The external electrodes may further include an intermediate portion disposed between the contact portion and the mounting portion, the intermediate portion being shorter than the contact portion and longer than the mounting portion.

The length of the contact portion may be longer than two times that of the mounting portion.

The length of the contact portion may be ½ or more of a half width of the capacitor component.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

Figure 1:
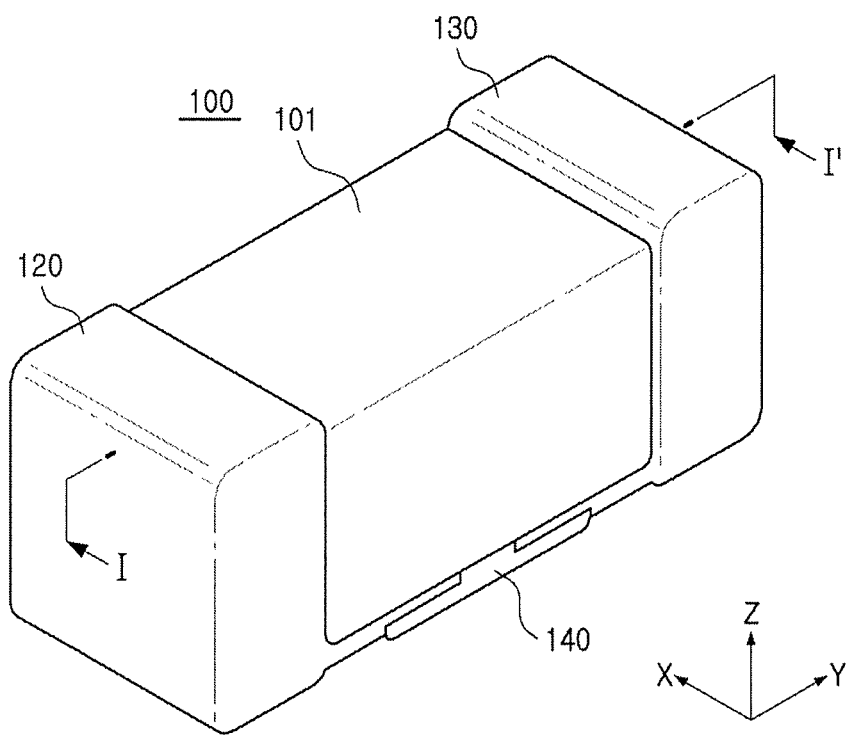
FIG. 1 is a perspective view schematically illustrating a capacitor component according to an exemplary embodiment in the present disclosure.
Figure 2:
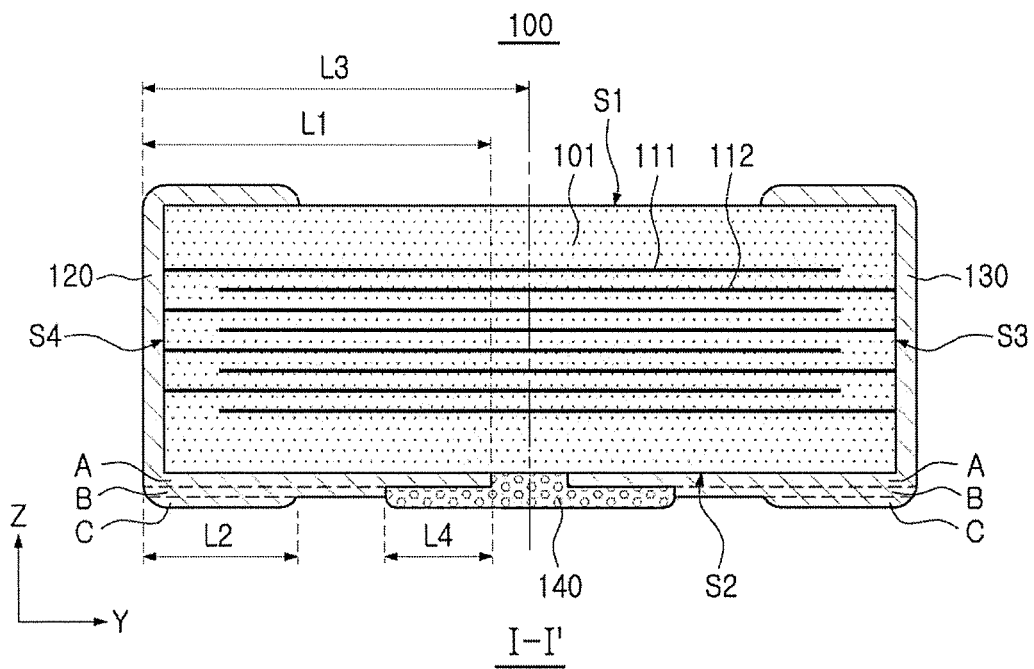
FIGS. 2 and 3 each are a cross-sectional view and a plan view of the capacitor component of FIG. 1.
Figure 3:
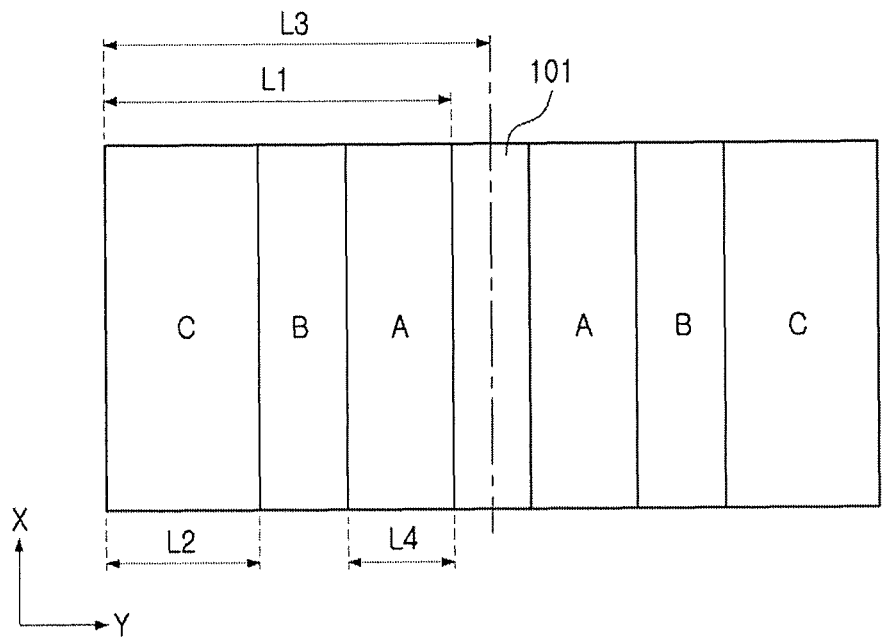

FIG. 1 is a perspective view schematically illustrating a capacitor component according to an exemplary embodiment in the present disclosure. FIG. 2 is a cross-sectional view and a plan view of the capacitor component of FIG. 1. FIG. 3 shows an external electrode in the capacitor component of FIG. 1, which has a shape viewed from below, and does not illustrate an insulating layer.

Referring to FIGS. 1 through 3, a capacitor component 100 according to an exemplary embodiment in the present disclosure may include a body 101, first and second internal electrodes 111 and 112 included in the body 101, and external electrodes 120 and 130, as main components, and when the external electrodes 120 and 130 are mounted, regions (lower portion in FIG. 2) of the external electrodes 120 and 130 coupled to a substrate may have a step structure.

The body 101 may have a multilayer structure in which a plurality of dielectric layers are stacked and include the first and second internal electrodes 111 and 112 alternately disposed with respective dielectric layers interposed therebetween. In this case, as shown in FIG. 2, the body 101 may include a first main surface S1 and a second main surface S2 facing each other in a thickness direction (Z direction in FIG. 2) in which the plurality of internal electrodes 111 and 112 are stacked, and side surfaces S3 and S4 facing each other in a length direction (X direction in FIG. 2) and connected to the first main surface S1 and the second main surface S2. In this case, the first main surface S1 and the second main surface S2 may each correspond to an upper surface and a lower surface of the body 101, on the basis of the illustrated shape. The specific shape of the body 101 is not particularly limited, but as shown, the body 101 may have a hexahedral shape or a shape similar to the hexahedral shape. Due to shrinkage of ceramic powder particles included in the body 101 during a firing process, the body 101 may not have a hexahedral shape having a perfect straight line but may have a substantially hexahedral shape. The surfaces S1 and S2 opposing to each other in the Z direction are referred to as a main surface but do not have special meaning, and may mean surfaces disposed perpendicular to the direction in which the internal electrodes 111 and 112 are stacked.

The dielectric layer included in the body 101 may be formed of a dielectric material such as ceramics known in the art and may include, for example, barium titanate ($BaTiO_3$)-based ceramic powder. In this case, the $BaTiO_3$-based ceramic powder may be, for example, $(Ba_{1-x}Ca_x)TiO_3$, $Ba(Ti_{1-y}Ca_y)O_3$ $(Ba_{1-x}Ca_x)$ $(Ti_{1-y}Zr_y)O_3$, $Ba(Ti_{1-y}Zr_y)O_3$ or the like in which calcium (Ca), zirconium (Zr) and the like are partially solidified in the $BaTiO_3$, and the $BaTiO_3$-based ceramic powder is not be limited thereto.

The body 101 may be divided into an active region forming a capacitance and a cover region located above and below the active region. Specifically, referring to FIG. 1, the active region may form a capacitance by the first and second internal electrodes 111 and 112, and the cover region may be disposed above and below the active region. In this case, the cover region may serve to prevent the first and second internal electrodes 111 and 112 from being damaged due to physical or chemical stress, and may have substantially the same material and composition as the dielectric layer of the active region except the fact that the cover region does not include the internal electrodes 111 and 112. In this case, the cover region may be obtained together with the active region by the green sheet laminating and sintering process. The cover region may be implemented in a form in which one or two or more green sheets are stacked on the upper and lower surfaces of the active region and sintered.

In the present exemplary embodiment, the internal electrodes may be divided into the first and second internal electrodes 111 and 112. The first and second internal electrodes 111 and 112 are alternately disposed to be opposed to each other, with each of the dielectric layers configuring the body 101 interposed therebetween and may be exposed to both ends of the body 101, respectively. At this time, the first and second internal electrodes 111 and 112 may be electrically separated from each other by the dielectric layer interposed therebetween. The material forming the first and second internal electrodes 111 and 112 is not particularly limited, and may be formed of, for example, a conductive paste formed of noble metal materials, such as palladium (Pd) and a palladium-silver (Pd—Ag) alloy, and one or more material of nickel (Ni) and copper (Cu). As a method for printing a conductive paste, a screen printing method or a gravure printing method may be used, and the printing method is not limited thereto. In addition, a thickness of the first and second internal electrodes 111 and 112 may be appropriately determined according to the use and the like and is not particularly limited, but the thickness may be, for example, 0.1 to 5 μm or 0.1 to 2.5 μm.

The external electrodes 120 and 130 may be formed on the side surfaces S3 and S4, the second main surface S2 and the like of the body 101, and as shown in FIG. 2, may include the first and second external electrodes 120 and 130 each connected to the first and second internal electrodes 111 and 112. The present exemplary embodiment describes the structure in which the capacitor component 100 has two external electrodes 120 and 130, but the number, the shape or the like of external electrodes 120 and 130 may be changed according to the shape of the internal electrodes 111 and 112 or other purposes.

In the case of the present exemplary embodiment, the external electrodes 120 and 130 may have a step shape to minimize an influence of stress which may occur when being mounted on the substrate or the like. This is to make areas of the regions of the external electrodes 120 and 130 in contact with the body 101 smaller than those of the regions thereof in contact with the substrate or the like. Specifically, in the regions of the external electrodes 120 and 130 formed on the second main surface S2 of the body 101, when a portion in contact with the second main surface S2 may be referred to as a contact portion A and a portion C disposed outside the contact portion A is a mounting portion, a length L1 of the contact portion A is longer than a length L2 of the mounting portion C. In addition, the external electrodes 120 and 130 are formed even on the first main surface S1, and the regions formed on the first and second main surfaces S1 and S2 may have an asymmetrical structure having different shapes.

When the capacitor component 100 is mounted on the substrate, the stress may be applied to the capacitor component 100 due to the bending of the substrate or the like. The stress may be transmitted in a form of bending energy through the external electrodes 120 and 130 disposed adjacent to the substrate. The external electrodes 120 and 130 according to the present exemplary embodiment may be less receive the bending energy by making the length L2 of the mounting portion C adjacent to the substrate relatively shorter, whereas the transmitted bending energy may be effectively distributed through a wide region of the body 101 by making the length L1 of the contact portion A in contact with the body 101 relatively longer. Therefore, since the stress transmitted to the body 101 through the external electrodes 120 and 130 may be reduced, the occurrence possibility of cracks in the body 101 and the like may be reduced and the structural stability and reliability of the capacitor component 100 may be improved.

As shown, the external electrodes 120 and 130 may have a 3-stage step structure in which an intermediate portion B, shorter than the contact portion A and longer than the mounting portion C, is further provided between the contact portion A and the mounting portion C. When the external electrodes 120 and 130 further include the intermediate portion B, a more effective stress distribution structure can be implemented. However, according to the exemplary embodiment, the external electrodes 120 and 130 may not include the intermediate portion B. In this case, the external electrodes 120 and 130 may have a 2-stage step structure including the contact portion A and the mounting portion C.

As the specific exemplary embodiment, the lengths of the contact portion A and the mounting portion C may be adjusted so that the stress distribution function of the external electrodes 120 and 130 is more effectively exerted. For example, the length L1 of the contact portion A may be longer than two times the length L2 of the mounting portion C so that the bending energy transmitted through the mounting portion C may be distributed to the wide region of the body 101. In addition, from a similar point of view, the length L1 of the contact portion A may be formed to be ½ or more of a length L3 corresponding to half of a width of the capacitor component 100.

An insulating layer 140 may be formed on the second main surface S2 of the body 101, and the insulating layer 140 may cover at least a part of the external electrodes 120 and 130, for example, at least a part of the contact portion A. The insulating layer 140 may be disposed between the first external electrode 120 and the second external electrode 130 having different polarities to prevent a short failure which may occur due to plating blur or the like. In addition, the insulating layer 140 may perform a function of adjusting the contact areas of the external electrodes 120 and 130 with a solder or the like by adjusting the areas of the external electrodes 120 and 130 exposed to the outside. For example, the insulating layer 140 may overlap with the contact portion A of the external electrodes 120 and 130 in the length direction by a predetermined length L4. The insulating layer 140 may be formed of materials such as a metal oxide and a resin having electrical insulating property. However, the insulating layer 140 is not necessarily provided in the capacitor component 100, and may be omitted according to the exemplary embodiment.

Meanwhile, the external electrodes 120 and 130 may be formed using any material as long as they have electrical conductivity like metal. However, the specific material may be determined in consideration of electrical characteristics, structural stability and the like within a range satisfying the above-described shape conditions, and the external electrodes 120 and 130 may further have a multilayer structure. This will be described with reference to FIGS. 4 and 5, and a duplicate description of other components other than the external electrodes will be omitted.

Figure 4:
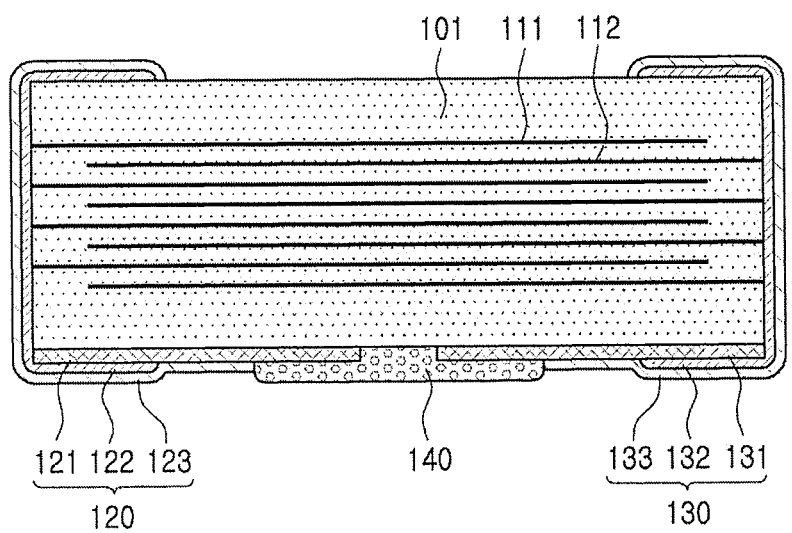
FIGS. 4 and 5 each are diagrams showing a capacitor component according to a modified exemplary embodiment.

In the modified example of FIG. 4, the external electrodes 120 and 130 may have the multilayer structure and include first layers 121 and 131, second layers 122 and 132 covering the side surfaces of the body 101 and the first layers 121 and 131, and third layers 123 and 133 covering the second layers 122 and 132. The first layers 121 and 131 may come into contact with the body 101 to form the contact portion A described in the above exemplary embodiment. As shown in FIG. 4, the first layers 121 and 131 may only be formed on the second main surface S2 of the body 101. The first layers 121 and 131 may include electrically conductive metals such as nickel (Ni), copper (Cu), palladium (Pd), gold (Au), or an alloy thereof. In addition, the first layers 121 and 131 may be sintered electrodes which are formed by sintering a paste including the metals.

The second layers 122 and 132 may cover the side surfaces of the body 101 and the first layers 121 and 131 and may also be formed on the first main surface S1 of the body 101. As the first layers 121 and 131 are formed only on the second main surface S2 of the body 101, the second layers 122 and 132 may be implemented on the side surfaces of the body 101 to be in contact with the body 101. As shown, on the second main surface S2 of the body 101, the second layers 122 and 132 may cover a portion of the first layers 121 and 131 and the regions of the first layers 121 and 131 not covered by the second layers 122 and 132 may be in contact with the third layers 123 and 133.

The stress applied to the capacitor component 100 may be further reduced by employing the second layers 122 and 132 corresponding to the intermediate layer on the second main surface S2 of the body 101. In consideration of this function, the second layers 122 and 132 may be a resin electrode including a resin, and may have a structure in which conductive metal particles are dispersed in a base resin, for example. The base resin may include a thermosetting polymer, and include, for example, an epoxy resin, an acrylic resin, or a mixture thereof. The conductive metal particles may include highly conductive materials such as Cu, Ag, and Ni. However, the second layers 122 and 132 may be implemented as a plating electrode rather than the resin electrode.

The third layers 123 and 133 may cover the second layers 122 and 132, and may be formed as, for example, a plating layer. The plating layer may include materials such as Ni and Sn. As an example, the third layers 123 and 133 may be formed as a double layer, and may include a Ni plating layer and an Sn plating layer. As shown, the third layers 123 and 133 may form outer layers of the external electrodes 120 and 130, and the portion formed on the second main surface S2 in the region covering the second layers 122 and 132 may form the mounting portion described in the above exemplary embodiment. As described above, the mounting portions of the third layers 123 and 133 are shorter than the contact portions formed by the first layers 121 and 131.

Figure 5:
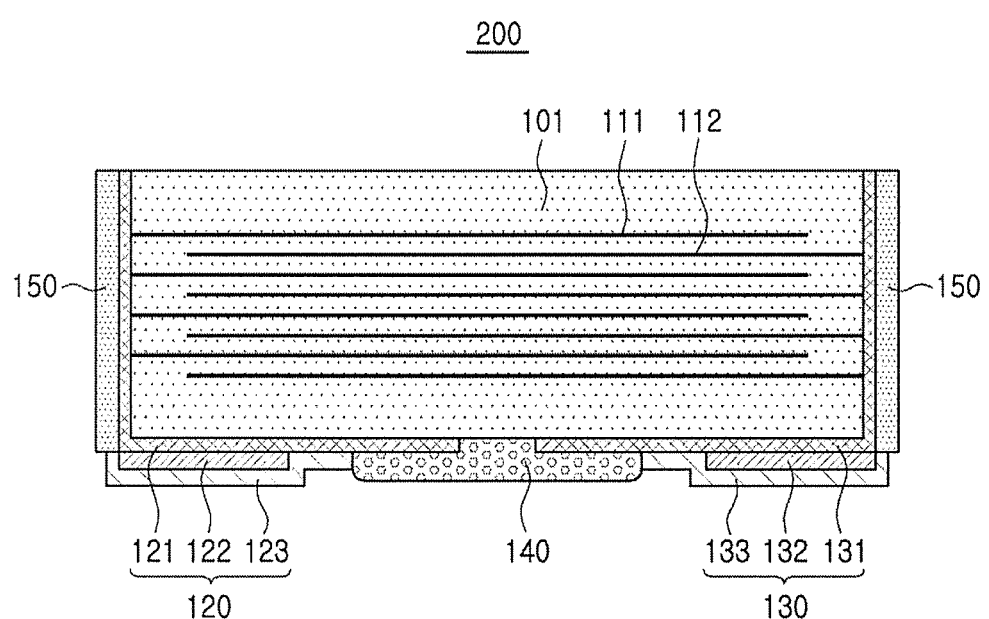

As another exemplary embodiment, the exemplary embodiment of FIG. 5 will be described. The capacitor component 200 shown in FIG. 5 differs from the above exemplary embodiment in terms of the shape of the external electrodes 120 and 130, but is the same in terms of the structure in which the stress is reduced by making the contact portion longer than the mounting portion. The capacitor component 200 may include the first layers 121 and 131, the second layers 122 and 132, and the third layers 123 and 133, and the first layers 121 and 131 are formed to cover the side surfaces and the second main surface S2 of the body 101 unlike the exemplary embodiment of FIG. 4. Here, the region covering the second main surface S2 of the body 101 in the first layers 121 and 131 may form the contact portion in contact with the body 101, and may be relatively longer to sufficiently secure the contact area with the body 101.

The second layers 122 and 132 may only be formed on the second main surface S2 of the body 101. Similarly, the third layers 123 and 133 may only be formed on the second main surface S2 of the body 101. In other words, in the present exemplary embodiment, the external electrodes 120 and 130 correspond to the lower electrode structure exposed only to the lower portion of the capacitor component 200. In this case, like the above exemplary embodiment, the second layers 122 and 132 may cover a portion of the first layers 121 and 131 and the regions of the first layers 121 and 131 not covered by the second layers 122 and 132 may be in contact with the third layers 123 and 133. The third layers 123 and 133 may form the outer layers of the external electrodes 120 and 130, and the portion formed on the second main surface S2 in the region covering the second layers 122 and 132 may form the mounting portion described in the above exemplary embodiment.

Meanwhile, a protective layer 150 may be provided to cover the region of the first layers 121 and 131 formed on the side surface of the body 101, thereby effectively protecting the external electrodes 120 and 130 other than the mounting region. The protective layer 150 may be formed of an electrically insulating material, for example, ceramic. In this case, the protective layer 150 may be formed of the same material as the dielectric layer configuring the body 101. In addition, the protective layer 150 may be formed of materials such as oxide and a resin instead of ceramic.

As set forth above, according to the exemplary embodiment in the present disclosure, the capacitor component which has the improved mechanical strength to be able to reduce the occurrence of cracks even when the capacitor component is mounted on the substrate may be obtained.

While exemplary embodiments have been shown and described above, it will be apparent to those skilled in the art that modifications and variations could be made without departing from the scope of the present invention as defined by the appended claims.

What is claimed is:

1. A capacitor component, comprising:
   a body having a first main surface and a second main surface facing each other in a thickness direction and side surfaces facing each other in a length direction and connected to the first and second main surfaces, the body including a plurality of dielectric layers and a plurality of internal electrodes stacked in the thickness direction and alternately exposed through the side surfaces of the body with each of the plurality of dielectric layers interposed therebetween; and
   external electrodes disposed on the side surfaces and the second main surface of the body and electrically connected to the plurality of internal electrodes,
   wherein each of the external electrodes has a contact portion extending on the second main surface and an outermost mounting portion disposed on the contact portion, and
   a length of the mounting portion in the length direction is smaller than a length of the contact portion in the length direction.

2. The capacitor component of claim 1, wherein the external electrodes have a first layer including the contact portion, a second layer covering a portion of the first layer, and a third layer covering a portion of the second layer.

3. The capacitor component of claim 2, wherein the first layer covers a portion of the second main surface of the body.

4. The capacitor component of claim 3, wherein the second layer is in contact with the side surfaces of the body.

5. The capacitor component of claim 4, wherein the second layer covers a portion of the first layer, and a region of the first layer not covered by the second layer is in contact with the third layer.

6. The capacitor component of claim 4, wherein the second layer further extends to cover a portion of the first main surface of the body.

7. The capacitor component of claim 2, wherein a portion which is a region of the third layer covering the second layer and disposed on the second main surface forms the mounting portion.

8. The capacitor component of claim 2, wherein the first layer covers the side surfaces and the second main surface of the body, and a region of the first layer covering the second main surface forms the contact portion.

9. The capacitor component of claim 8, wherein the second layer covers at least the second main surface of the body.

10. The capacitor component of claim 9, wherein the third layer covers at least the second main surface of the body.

11. The capacitor component of claim 10, wherein the second layer covers a portion of the first layer, and a region of the first layer not covered by the second layer is in contact with the third layer.

12. The capacitor component of claim 8, further comprising:
    a protective layer covering portions of the first layer that corresponds to the side surfaces of the body.

13. The capacitor component of claim 2, wherein the first layer is a sintered electrode, the second layer is a resin electrode, and the third layer is a plating layer.

14. The capacitor component of claim 1, further comprising:
    an insulating layer formed on the second main surface of the body to cover at least a part of the contact portion.

15. The capacitor component of claim 14, wherein the insulating layer overlaps with the contact portion of the external electrodes in the length direction by a predetermined length.

16. The capacitor component of claim 1, wherein the external electrodes further extend to cover a portion of the first main surface, and portions of the external electrodes corresponding to the first and second main surfaces have an asymmetrical structure with respect to each other.

17. The capacitor component of claim 1, wherein the external electrodes further include an intermediate portion which is disposed between the contact portion and the mounting portion, the intermediate portion being shorter than the contact portion and longer than the mounting portion.

18. The capacitor component of claim 1, wherein the length of the contact portion is longer than two times the length of the mounting portion.

19. The capacitor component of claim 1, wherein the length of the contact portion is ½ or more of a half width of the capacitor component.

20. The capacitor component of claim 1, wherein each of the external electrodes has a reduced-thickness portion in the thickness direction on the second main surface.

21. A capacitor component, comprising:
    a body having a first main surface and a second main surface facing each other in a thickness direction and side surfaces facing each other in a length direction and connected to the first and second main surfaces, the body including a plurality of dielectric layers and a plurality of internal electrodes stacked in the thickness direction and alternately exposed through the side surfaces of the body with each of the plurality of dielectric layers interposed therebetween; and
    external electrodes disposed on the side surfaces and the second main surface of the body and electrically connected to the plurality of internal electrodes,
    wherein each of the external electrodes has a portion having a multiple step shape disposed on the second main surface, where the thickness of an outer portion of the multiple step shape is thicker than that of an inner portion of the multiple step with respect to the center of the body.

22. The capacitor component of claim 21, further comprising:
an insulating layer formed on the second main surface of the body to cover at least a part of the contact portion.

23. The capacitor component of claim 21, wherein the external electrodes further extend to cover a portion of the first main surface, and portions of the external electrodes corresponding to the first and second main surfaces have an asymmetrical structure with respect to each other.

* * * * *